US012807306B2

(12) United States Patent
Love

(10) Patent No.: US 12,807,306 B2
(45) Date of Patent: Nov. 24, 2026

(54) ANTI-LOCK BRAKING SYSTEM

(71) Applicant: SAFRAN LANDING SYSTEMS UK LTD., Gloucestershire (GB)

(72) Inventor: Tom Love, Gloucestershire (GB)

(73) Assignee: SAFRAN LANDING SYSTEMS UK LTD., Gloucestershire (GB)

( * ) Notice: Subject to any disclaimer, the term of this patent is extended or adjusted under 35 U.S.C. 154(b) by 292 days.

(21) Appl. No.: 18/559,158

(22) PCT Filed: May 5, 2022

(86) PCT No.: PCT/EP2022/062175
§ 371 (c)(1),
(2) Date: Nov. 6, 2023

(87) PCT Pub. No.: WO2022/234027
PCT Pub. Date: Nov. 10, 2022

(65) Prior Publication Data

US 2024/0228028 A1 Jul. 11, 2024

(30) Foreign Application Priority Data

May 6, 2021 (EP) .................................... 21172571

(51) Int. Cl.
*B64C 25/46* (2006.01)
*B60T 8/17* (2006.01)
*B60T 8/36* (2006.01)

(52) U.S. Cl.
CPC ............ *B64C 25/46* (2013.01); *B60T 8/1703* (2013.01); *B60T 8/369* (2013.01)

(58) Field of Classification Search
CPC . B60T 8/369; B60T 8/00; B60T 8/325; B60T 8/1703; B64C 25/46
See application file for complete search history.

(56) References Cited

U.S. PATENT DOCUMENTS

| | | | | |
|---|---|---|---|---|
| 3,759,583 A * | 9/1973 | Peruglia | B60T 8/5087 | 303/61 |
| 4,690,465 A * | 9/1987 | Takeda | B60T 8/368 | 303/119.3 |
| 4,705,323 A * | 11/1987 | Imoto | B60T 8/348 | 188/72.4 |

(Continued)

FOREIGN PATENT DOCUMENTS

| | | |
|---|---|---|
| CN | 101861487 A | 10/2010 |
| CN | 102343900 A | 2/2012 |

(Continued)

OTHER PUBLICATIONS

Office Action received for European Application No. 21172571.8, mailed on Apr. 18, 2024, 5 pages.

(Continued)

*Primary Examiner* — Henry Y Liu
(74) *Attorney, Agent, or Firm* — WOMBLE BONDLE DICKINSON (US) LLP

(57) ABSTRACT

An anti-lock braking system for an aircraft, including a braking actuator configured to apply a braking pressure to a brake stator, and a piezoelectric actuator connected in series with the braking actuator. The piezoelectric actuator is operable to modify the braking pressure applied to the brake stator to provide anti-skid protection.

13 Claims, 2 Drawing Sheets

(56) References Cited

U.S. PATENT DOCUMENTS

| | | | | | |
|---|---|---|---|---|---|
| 4,738,493 | A * | 4/1988 | Inagaki | B60T 8/404 303/113.1 |
| 4,765,140 | A * | 8/1988 | Imoto | F16D 29/00 188/72.4 |
| 4,765,429 | A * | 8/1988 | Sato | B60T 8/322 303/190 |
| 4,824,183 | A * | 4/1989 | Uchida | B60T 8/4275 303/122.07 |
| 4,826,256 | A * | 5/1989 | Von Hayn | B60T 8/445 303/61 |
| 4,842,343 | A * | 6/1989 | Akiyoshi | B60T 8/17616 303/68 |
| 4,854,424 | A * | 8/1989 | Yamatoh | B60T 8/54 303/191 |
| 4,860,859 | A * | 8/1989 | Yamatoh | B60T 8/326 188/332 |
| 5,000,521 | A * | 3/1991 | Majima | B60T 8/4809 303/119.2 |
| 5,067,778 | A * | 11/1991 | Testardi | B60T 8/00 303/119.2 |
| 5,090,518 | A * | 2/1992 | Schenk | B60T 8/00 188/72.1 |
| 5,350,225 | A * | 9/1994 | Steiner | B60T 8/4854 303/114.3 |
| 5,445,185 | A * | 8/1995 | Watanabe | B60G 17/01941 137/596.17 |
| 5,553,828 | A * | 9/1996 | Jaenker | B60T 8/4266 251/129.01 |
| 5,566,703 | A * | 10/1996 | Watanabe | B60G 17/01941 137/596.17 |
| 5,645,143 | A * | 7/1997 | Mohr | B60T 8/4072 303/162 |
| 5,944,394 | A * | 8/1999 | Friederichs | B60T 8/1764 303/140 |
| 6,003,960 | A * | 12/1999 | Gronau | B60T 8/36 303/166 |
| 6,019,437 | A * | 2/2000 | Barron | F16K 99/0011 303/113.1 |
| 6,213,564 | B1 * | 4/2001 | Face, Jr. | H10N 30/2048 303/3 |
| 6,241,326 | B1 * | 6/2001 | Ferguson | B60T 8/268 303/177 |
| 6,533,366 | B1 * | 3/2003 | Barron | B60T 8/4275 310/307 |
| 8,075,066 | B2 * | 12/2011 | Greer | B60T 8/5093 303/157 |
| 8,720,652 | B2 * | 5/2014 | Certo | F16D 65/18 188/72.3 |
| 2004/0040797 | A1 * | 3/2004 | Plude | F16D 65/186 188/156 |
| 2004/0174067 | A1 * | 9/2004 | Kamiya | B60T 8/00 303/191 |
| 2010/0219360 | A1 | 9/2010 | Mumford | |
| 2017/0267220 | A1 * | 9/2017 | Serra | B60T 8/52 |
| 2019/0152458 | A1 * | 5/2019 | Akahane | B60T 8/4077 |
| 2019/0154164 | A1 | 5/2019 | Mikota | |
| 2019/0202550 | A1 | 7/2019 | Evans | |
| 2020/0317171 | A1 * | 10/2020 | Lestage | B60T 13/686 |

FOREIGN PATENT DOCUMENTS

| | | | |
|---|---|---|---|
| CN | 109073110 | A | 12/2018 |
| CN | 109969386 | A | 7/2019 |
| GB | 2478368 | A | 9/2011 |
| GB | 2478423 | A | 9/2011 |
| JP | 61-077554 | A | 4/1986 |
| KR | 101732519 | B1 | 5/2017 |

OTHER PUBLICATIONS

European Search Report and Search Opinion received for EP Application No. 21172571.8, mailed on Oct. 4, 2021, 7 pages.

International Search Report and Written Opinion received for PCT Patent Application No. PCT/EP2022/062175, mailed on Sep. 5, 2022, 13 pages.

First Office Action for Chinese patent application 202280046266.2, Mar. 25, 2026, 11 pages. [includes English translation].

* cited by examiner

ANTI-LOCK BRAKING SYSTEM

BACKGROUND OF THE INVENTION

The present invention relates to aircraft braking systems, and more specifically to aircraft anti-lock braking systems. An anti-lock, or anti-skid, system is intended to modify the braking force in the event of a braked wheel slipping.

The current state of the art for aircraft brakes are centrally supplied hydraulic brakes, electrohydraulic actuator (EHA) brakes and, more recently, the emergence of electromechanical (EMA) brakes. For hydraulic brakes (either centrally supplied or EHA), the anti-skid function is achieved through metering of hydraulic fluid to and from the brake actuator to modify the braking pressure.

Anti-skid control is a highly dynamic application, which requires a fast response of the actuator. However, the responsiveness and resolution of conventional braking systems is limited, and dynamic operation of those systems leads to energy losses, resulting in a less effective and less efficient anti-lock braking system. Furthermore, using conventional hydraulic systems to provide anti-skid protection requires tightly toleranced manufacturing of servo-valves, and EMA systems often wear due to oscillating control.

SUMMARY OF THE INVENTION

The present inventors have found that the high stiffness of piezoelectric actuators makes them more suitable for highly dynamic applications and fast response times, such as required in anti-lock braking systems. Piezoelectric actuators have high resolution (capable of very fine control) and, as there is no fluid returned to a tank, there is less energy lost. However, piezoelectric actuators cannot achieve the high displacement required to function as high-stroke actuators without substantial amplification, which results in a loss of force capability.

To mitigate this and other problems, the present inventors have separated the two conflicting demands of high displacement and high precision/response. The solution in essence uses a conventional braking system, such as centrally supplied hydraulics, EHA, or EMA, in combination with a piezoelectric actuator.

The conventional, high-stroke actuator is responsible for the relatively large stroke of closing the initial clearance between the brake piston and stator of the brake, and optionally also applying the desired braking pressure. Once 'full' braking pressure is reached, anti-skid control can then be achieved through the use of the low-stroke, high-force piezoelectric actuator.

According to one aspect of the invention there is provided an anti-lock braking system for an aircraft, comprising: a braking actuator configured to apply a braking pressure to a brake stator; and a piezoelectric actuator integrated with the braking actuator, wherein the piezoelectric actuator is operable to modify the braking pressure applied to the brake stator to provide anti-skid/slip protection.

Optionally, the piezoelectric actuator is connected in series with the braking actuator. By connected in series, it is meant that the braking actuator and the piezoelectric actuator are mechanically connected, such that the respective displacements of the actuators combine. In other words, the extension axis (longitudinal axis defined by the extension of the actuator) of the piezoelectric actuator is aligned with and parallel to the extension axis of the braking actuator.

A modification of the braking pressure can be a reduction in braking pressure, and/or a modulation (e.g. high-frequency alternation) of the braking pressure. The piezoelectric actuator can comprise a piezoelectric element, preferably a piezoelectric stack, and an electronic drive unit configured to control the piezoelectric element. The piezoelectric element with oscillatory high voltage/low current supply. Control can be purely supply ON/supply OFF.

With this arrangement, an improved anti-lock braking system can be provided. In particular, a more responsive anti-lock braking system can be achieved, capable of finer control and with reduced energy loss when operating dynamically. The system can also be less prone to wear and can be more reliable. Furthermore, the system can have reduced complexity, size and/or mass compared to the prior art arrangements.

The anti-lock braking system may be operable in a first phase and a second phase. The first phase may be referred to as a 'normal', or 'high-stroke', braking phase, which can be responsible for the relatively large stroke of closing the initial clearance between the brake piston and stator and applying the desired braking pressure. The braking pressure can be exerted by the braking actuator extending from a first extension state to a second (greater) extension state. The piezoelectric actuator is also operable between first and second extension states. In the first phase, the piezoelectric actuator is arranged to be in an extended state. The piezoelectric actuator can assume an extended state when energised by the electronic drive unit (i.e. when a voltage is applied to the piezoelectric element). In the second phase, the braking actuator is configured to remain in the second extension state and the piezoelectric actuator is configured to retract from the extended state to a retracted state. In other words, once 'full' braking pressure is achieved, the high-stroke braking actuator can be fixed at its current stroke and the anti-skid function can be provided by the piezoelectric actuator retracting to modify (in this instance by reducing) the braking pressure applied to the brake stator. The piezoelectric actuator can retract when it is de-energised (i.e. when the electronic drive unit stops applying a voltage to the piezoelectric element).

Alternatively, the piezoelectric actuator could be configured to assume an extended state when de-energised by the electronic drive unit, and to retract when it is energised.

In the second phase the braking actuator may be arranged to be locked in the second extension state. Where the braking actuator is a hydraulic actuator, the braking actuator can be locked in the second extension state by controlling entry and exit of hydraulic fluid to and from an active chamber of the braking actuator. With this arrangement, the stiffness of the system is increased when operating in the second phase, which increases responsiveness and reduces energy losses.

When the braking actuator is an EMA, the braking actuator can be locked in position by using, for instance, a brake or a motor to hold the extension. This arrangement can avoid the need for fine manufacturing to deal with mechanical backlash in EMAs and can reduce wear due to the very small oscillations on mechanical transmissions.

The braking actuator may be hydraulic actuator, such as a centrally supplied hydraulic actuator, or an EHA. Alternatively, the braking actuator can be an EMA.

The braking actuator and the piezoelectric actuator may be arranged such that the braking actuator is positioned adjacent to the brake stator. In other words, the braking actuator may be positioned between the piezoelectric actuator and the brake stator. Alternatively, the braking actuator and the piezoelectric actuator may be arranged such that the piezoelectric actuator is positioned adjacent to the brake stator, between the braking actuator and the brake stator. As will be appreciated, there may be a mechanical clearance between the braking actuator/piezoelectric actuator and the brake stator when the brakes are not being applied.

Preferably, the braking actuator is a hydraulic actuator and the piezoelectric actuator is further configured to lock the hydraulic braking actuator when modifying the braking pressure to provide anti-skid protection. With this arrangement, the piezoelectric actuator can provide both the locking function and the anti-skid protection, thereby reducing the complexity of the system and/or the number of separate components. This can improve reliability, as well as increasing the stiffness of the system when locked, improving the performance of the piezoelectric actuator.

The piezoelectric actuator may be operable to lock the hydraulic braking actuator by controlling the entry and exit of hydraulic fluid to and from an active chamber of the braking actuator. For example, the piezoelectric actuator may be operable to lock the braking actuator by physically blocking entry and exit of hydraulic fluid to and from the active chamber.

The piezoelectric actuator may be operable to lock the hydraulic braking actuator and to modify the braking pressure applied to the brake stator by moving within an active chamber of the hydraulic braking actuator. The piezoelectric actuator may be operable to move between at least a first position, a second position and a third position. In the first position the piezoelectric actuator may permit the entry and exit of hydraulic fluid to and from the active chamber. In the second position and the third position, the piezoelectric actuator may block the entry and exit of hydraulic fluid from the active chamber. The piezoelectric actuator may be operable to modify the braking pressure applied to the brake stator to provide anti-skid protection by moving between the second position and the third position. As such, the braking actuator may be hydraulically locked by the piezoelectric actuator during anti-skid operation.

The second position of the piezoelectric actuator may be a greater extension state than the first position, and the third position of the piezoelectric actuator may be a greater extension state than the second position. For example, the first position may be a retracted (e.g., de-energised) state in which the piezoelectric actuator occupies the least space within the active chamber of the hydraulic braking actuator. The piezoelectric actuator may be extended to the second position, and subsequently to the third position, by applying increased voltages to the piezoelectric stack, causing the piezoelectric actuator to occupy more space within the active chamber, thereby increasing the hydraulic pressure in the active chamber.

The hydraulic braking actuator may comprise one or more ports for fluidly connecting an active chamber of the hydraulic braking actuator to a supply of hydraulic fluid (e.g., a supply line or a return line). The piezoelectric actuator may be operable to lock the hydraulic braking actuator by blocking (i.e., covering or obscuring in a fluid-tight manner) the one or more ports. The number of ports may be selected taking into account the desired flow and the strength of the hydraulic braking actuator. As will be appreciated, a greater number of ports can increase the flow rate into and out of the active chamber, while fewer ports can increase the strength of the cylinder.

The piezoelectric actuator may comprise a piezoelectric stack and a piston assembly (e.g., a metallic disk coupled to the piezoelectric stack). The piston assembly may move under the influence of the piezoelectric stack to lock the hydraulic braking actuator and modify the braking pressure. The piezoelectric actuator may be arranged such that the piston assembly provides an interface between the piezoelectric stack and the hydraulic fluid in the active chamber.

The anti-lock braking system may also comprise a binary fluid control valve operable to selectively connect the hydraulic braking actuator between a hydraulic fluid source line and a hydraulic fluid return line.

According to a further aspect of the invention, there is provided an aircraft landing gear comprising the anti-lock braking system according to any of the descriptions above. According to a further aspect of the invention, there is provided an aircraft comprising the aircraft landing gear.

BRIEF DESCRIPTION OF THE DRAWINGS

Embodiments of the invention will now be described with reference to the accompanying drawings, in which.

DETAILED DESCRIPTION OF EMBODIMENTS

In the most general sense, the invention uses a conventional braking system, such as centrally supplied hydraulics, EHA, or EMA, in combination with a piezoelectric actuator. The conventional, high-stroke actuator is responsible for the relatively large stroke of closing the initial clearance between the brake piston and stator of the brake, and optionally also applying the desired braking pressure. Once 'full' braking pressure is reached, anti-skid control can then be achieved through the use of the low-stroke, high-force piezoelectric actuator.

Figure 1:
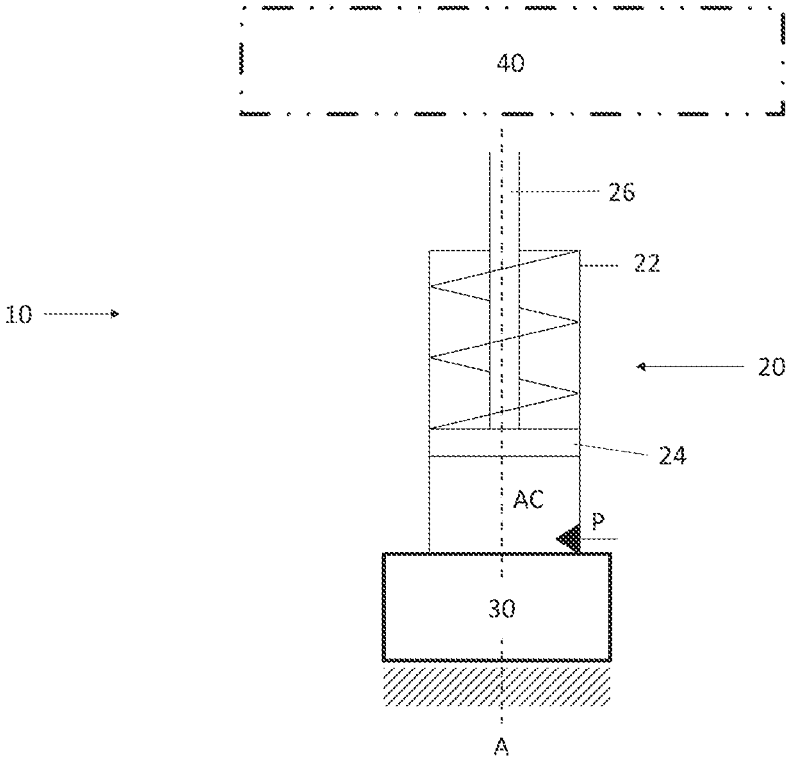
FIG. 1 is a diagram of an anti-lock braking system according to an embodiment of the invention.

FIG. 1 is a diagram of an anti-lock braking system 10 in accordance with an example of the invention. The braking system 10 comprises a high-stroke braking actuator 20 coupled in series with a piezoelectric actuator 30.

The high-stroke braking actuator 20 is illustrated in FIG. 1 as a hydraulic actuator, but could be any suitable braking actuator. The hydraulic braking actuator 20 comprises a cylinder 22 within which a piston and rod assembly 24, 26, is slidably housed so that the actuator 20 can extend and retract along a longitudinal axis A. The cylinder 22 includes a port P for coupling the actuator 20 to a hydraulic fluid supply circuit (not shown), such as a central hydraulic system. The high-stroke actuator 20 shown in FIG. 1 is single acting in that there is a single port P defining a single active chamber. The space within the cylinder 22 between the port P and piston 24 defines an active chamber AC (also referred to as an extension chamber) 30) that hydraulic fluid such as oil can be supplied to in order to cause the actuator 20 to extend. As shown, the piston rod 26 of the braking actuator is coupled to one or more brake stators 40. When the braking actuator 20 extends, the one or more brake stators 40 apply a braking pressure to one or more rotors fixed to a wheel (not shown). Friction between the stator(s) and rotor(s) applies a braking torque which acts to slow the rotation of the wheel (or prevent it from rotating in the case where the aircraft is stationary). Of course, in practice aircraft braking assemblies are more complicated and comprise many more elements besides. For instance, in practice a braking assembly for a single wheel may have multiple braking actuators. However, description of those elements is not necessary for the purposes of understanding the present invention.

The piezoelectric actuator 30 can be any suitable piezoelectric actuator. For example, the piezoelectric actuator 30 can comprise a piezoelectric element, preferably a piezoelectric stack, driven by an electronic drive unit. The piezoelectric actuator 30 is operable to extend and retract along the longitudinal axis A. The piezoelectric stack may be configured to assume a retracted position when de-energised and to respond to an applied voltage by extending. Alternatively, the piezoelectric stack may be configured to assume an extended position when de-energised and to respond to an applied voltage by retracting. As will be appreciated, either configuration can be achieved through appropriate selection of the piezoelectric material (e.g. the polarisation), or by means of amplification.

The piezoelectric actuator 30 is coupled in series with the high-stroke braking actuator 20, for example as shown in FIG. 1. In other words, the piezoelectric actuator 30 is mechanically connected to the high-stroke braking actuator 20 such that the extension axis of each actuator is aligned with and parallel to the axis A, as shown. As an example, the piezoelectric actuator 30 can be placed in mechanical 20) communication with (e.g. affixed to) an end of the cylinder casing 22 of the high-stroke actuator, on the opposite side to the piston rod/stator. Alternatively, the piezoelectric actuator 30 and high-stroke actuator 20 could be arranged such that the piezoelectric actuator 30 is adjacent to (and acts on) the brake stator 40. In either case, the total displacement delivered to the brake stator 40 is a combination of the respective displacements of the piezoelectric actuator 30 and the high-stroke actuator 20.

As described above, the high-stroke actuator 20 is responsible for the relatively large stroke of closing the initial clearance between the brake piston and stator of the brake, and applying the desired braking pressure. This is referred to as a first phase. Sticking to the hydraulic braking actuator example, in the first phase a hydraulic fluid supply circuit supplies hydraulic fluid under pressure to the port P of the braking actuator 20 (e.g. from a reservoir of a central hydraulic system). Hydraulic fluid entering the port P into the active chamber AC forces the piston 24 towards the side of the casing 22 from which the rod 26 extends. This causes the actuator 20 to change during the first phase between first and second extension states, which in turn applies a braking force to the brake rotor(s) via one or more brake stators 40, as discussed above. It will be appreciated that the same function could be achieved with an actuator of a different type, such as an EMA. The piezoelectric actuator 30 can be extended throughout the first phase, by energising the piezoelectric stack (applying a voltage using the electronic drive unit). Equally, the piezoelectric actuator could be configured such that it is extended when de-energised (no voltage is applied). Alternatively, the piezoelectric stack may be initially retracted (or at least not fully extended) during movement of the braking actuator. In this case, the braking actuator may be arranged to close the initial clearance between the brake piston and the stator(s) without resulting a braking torque and the piezoelectric actuator may be used (extended) to apply the braking pressure.

Once 'full' braking pressure is reached (i.e. once the desired braking force is applied, but the wheels have started to or are close to slipping), anti-skid control can then be achieved in a second phase through the use of the low-stroke, high-force piezoelectric actuator 30. Any suitable anti-skid sensing and control can be used.

In the second phase, the high-stroke braking actuator 20 is locked, or fixed at its current stoke position (or otherwise remains in the second extension state). In the hydraulic braking actuator example, this can be achieved by controlling (i.e. preventing) entry and exit of hydraulic fluid into the active chamber AC. The anti-skid function is then achieved by retracting (i.e. de-energising) the piezoelectric actuator 30 to modify the braking pressure applied to the brake stator 40. As will be appreciated, a retraction of the piezoelectric actuator 30 whilst the high-stroke actuator 20 is locked in position results in a relatively small reduction in braking pressure applied to the brake stator 40, which in turn relieves the braking torque applied to the wheel(s). The braking pressure can be continuously modulated for a period of time, as required to prevent skidding. For instance, a closed loop control system may be used to automatically regulate the braking pressure as required. In some instances, the piezoelectric actuator may be driven to alternate between extended and retracted states, but it will be appreciated that the form of brake pressure modulation will depend on the circumstances (as determined, for example, by closed loop control). The piezoelectric stack can be driven with high voltage/low current supply.

The concept described above seeks to improve the dynamic response of an antiskid braking system by using the highly dynamic nature of a piezoelectric actuator in combination with "normal" hydraulic or EMA/EHA systems to deal with the relatively high displacement and velocity required to close mechanical clearances in the braking system. Once the clearance is overcome, the dynamic response required for anti-skid is in practice only fully realised with a stiff system, which includes not only the piezoelectric actuator but also the transmission of force from piezoelectric actuator to the braking piston. In the above example of adapting a standard aircraft hydraulic system, this can be achieved by locking the hydraulic fluid at maximum pressure to overcome the compressibility in the fluid lines and piston to create a stiff column of fluid. The hydraulic actuator can be locked, for example, via an external fluid control valve for selectively connecting the port P to the supply or return lines of the hydraulic circuit. Once locked, the piezo, with its low displacement but high force capability, can achieve the desired high accuracy and responsive brake control.

The discussion so far has envisaged a piezoelectric actuator in mechanical connection with a separate high-stroke braking actuator, such that the extension axis of each actuator is parallel to the axis A and the displacements of the actuators combine along the axis A to apply a braking pressure. However, in an alternative arrangement, the piezoelectric actuator can be integrated with the hydraulic braking actuator and arranged to modify the hydraulic pressure within the active chamber AC. An example of such an arrangement is shown in FIG. 2, discussed below.

The inventors have found that with this arrangement the system can be designed so that the piezoelectric actuator used to provide anti-skid protection can also be used to lock the braking actuator. In particular, the piezoelectric actuator can be arranged to selectively block the entry and exit of hydraulic fluid during the anti-skid operation. This can reduce the complexity and/or number of components in the system, as well as increasing the stiffness of the system and improving reliability.

Figure 2:
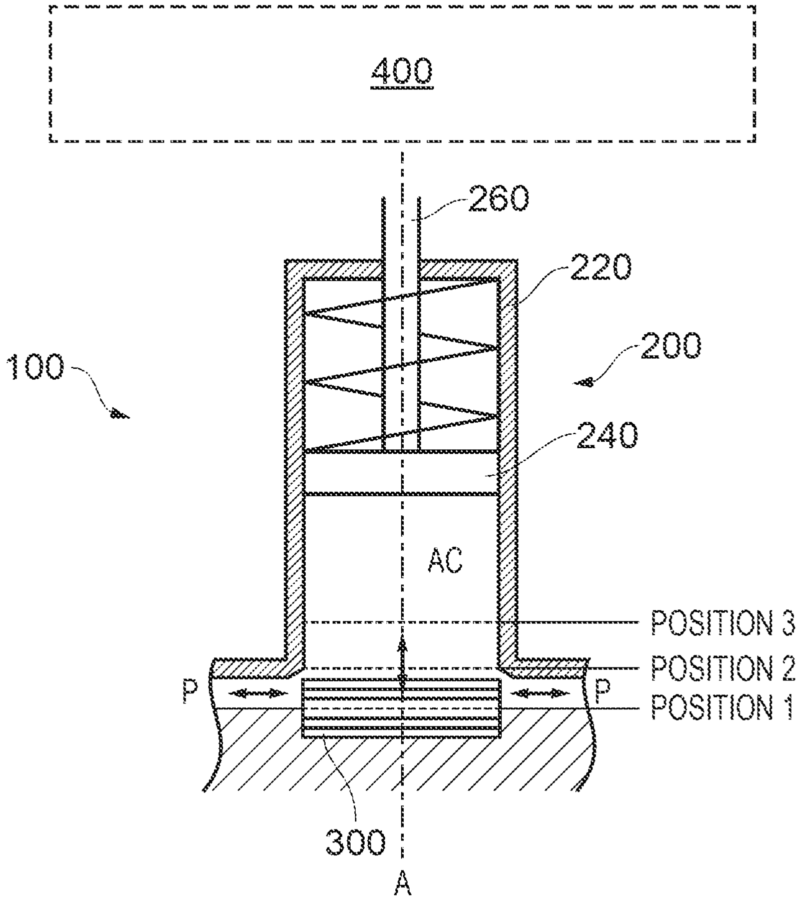
FIG. 2 is a diagram of an anti-lock braking system according to a further embodiment of the invention.

FIG. 2 shows an example of a system 100 in which this can be achieved. The braking system 100 comprises a high-stroke hydraulic braking actuator 200 with an integrated piezoelectric actuator 300. Like the braking actuator 20 of FIG. 1, the hydraulic braking actuator 200 shown in FIG. 2 comprises a cylinder 220 within which a piston and rod assembly 240, 260, is slidably housed so that the actuator 200 can extend and retract along a longitudinal axis A. However, the skilled person will appreciate other suitable arrangements. The cylinder 220 includes one or more ports P for coupling the actuator 200 to a hydraulic fluid supply circuit, such as a central hydraulic system, via a binary fluid control valve (not shown). When unobstructed, the ports P permit the flow of hydraulic fluid into or out of the active chamber AC, depending on the position of the binary fluid control valve. Two ports P are visible in the cross-section shown in FIG. 2, but there may be additional ports distributed around the circumference of the cylinder 220, as required to achieve the desired flow. The space within the cylinder 220 (bounded at one end by the piston 240 and, in some examples, at the other end by the piezoelectric actuator 300) defines an active chamber AC (also referred to as an extension chamber) that hydraulic fluid such as oil can be supplied to, via the ports P, to cause the actuator 200 to extend. As in FIG. 1, the piston rod 260 of the braking actuator is coupled to one or more brake stators 400, which function to apply a braking pressure to one or more rotors fixed to a wheel as described above.

The piezoelectric actuator 300 can be any suitable piezoelectric actuator, as described above in relation to FIG. 1. The piezoelectric actuator 300 is arranged to move within the active chamber AC of the hydraulic braking actuator 200 to modify the braking pressure and to control the entry and exit of hydraulic fluid. For example, extension of the piezoelectric actuator 300 into the active chamber AC increases the hydraulic pressure within the active chamber AC (by reducing the volume of the active chamber AC) whilst also blocking the exit of hydraulic fluid via the ports P.

The piezoelectric actuator 300 is operable to move between at least three positions, shown in FIG. 2 as positions 1, 2 and 3. Some or all of the positions may be discrete extension states of the piezoelectric actuator 300 that are pre-programmed (for example, by applying predetermined voltages to the piezoelectric stack) and/or points (e.g., upper and lower limits) in a continuum. For example, the piezoelectric actuator 300 may be operable to move discretely between positions 1 and 2 but continuously between positions 3 and 4.

Initially, the piezoelectric actuator 300 may be in position 1. In position 1, the ports P are unobscured and so as braking is requested to start the binary control valve is able to direct hydraulic fluid towards the brake piston. The inflow of hydraulic fluid extends the brake piston against the relatively low resistance offered by the seal friction of the brake piston, closing the clearance between the brake piston and the stators. As the brake piston makes contact with stators, and the stators in turn make contact with rotors of the wheel, a braking pressure can be realised. Equally, it may be that the full pressure achievable by filling the active chamber AC from the hydraulic supply (i.e., the 'filling' pressure) simply closes the mechanical clearances in the braking system without applying a torque to the wheels. As the full filling pressure from the hydraulic supply is approached, the piezoelectric actuator 300 extends from position 1 to position 2 (as illustrated in FIG. 2). In position 2, the ports of the cylinder 220 are obscured by the piezoelectric actuator 300 (in this simplified example, by the piezoelectric stack itself), which shuts the active chamber AC and locks the hydraulic fluid inside. A seal around the piezoelectric actuator 300 can ensure fluid tightness. With the fluid is locked in place at the filling pressure, the piezoelectric actuator 300 can be extended to position 3 to increase the pressure to a maximum braking pressure and hence maximum braking torque on the wheels. The piezoelectric actuator 300 can be controlled between position 2 and position 3 (e.g., in a continuous manner using a closed loop controller) to control the anti-skid braking pressure. For example, the piezoelectric actuator 300 may be controlled to move in a continuum between positions 2 and 3 as required to maintain maximum braking torque without skidding.

Whilst the braking actuator 200 is locked by the piezoelectric actuator 300, the binary fluid control valve may be switched to a return position to reference fluid in the line between the piezoelectric actuator 300 and the binary control valve back to a reservoir. Once the desired braking is achieved, the piezoelectric actuator 300 can move back towards position 1, which unlocks the braking actuator 200 by reopening the fluid connection between the active chamber AC and the binary control valve. Depending on the volumes between the binary control valve and the piezoelectric actuator 300, this position can be used to moderate the slow release of the brake. If the volumes are high, then the brake will simply open and return fluid to the reservoir.

Alternatively, for safety reasons, the binary control valve may be left unchanged (i.e., to provide fluid from the source) until, for example, the aircraft has come to a complete standstill. In this way, if the piezoelectric actuator 300 is released, a braking pressure can be maintained and/or the brakes can be reapplied more quickly (without having to re-close mechanical clearances).

It can be seen from the above operation that the piezoelectric actuator 300 cooperates with the ports P to provide an internal/integrated fluid control valve that controls the entry and exit of hydraulic fluid to and from the active chamber AC. In position 1, the integrated fluid control valve can be considered open (or partly open), while in positions 2 and 3 the integrated fluid control valve can be considered shut. By locking the hydraulic fluid at maximum filling pressure, the hydraulic fluid in the active chamber AC is compressed to create the stiff column of fluid. Thus, once locked, the low displacement but high force capability of the piezoelectric actuator 300 can be used to achieve a highly accurate and responsive brake control. However, depending on the desired application (i.e., the forces required, displacements of the piezoelectric actuator, etc.), the piezoelectric actuator 300 may be operable to lock the brake actuator 200 at high, intermediate, or low pressure. This will be further influenced by the specific method of shutting the ports P to the active chamber AC.

The example shown in FIG. 2 is a simple illustrative form. More complex modifications could include amplification of the piezoelectric actuator, or piloting of another entrance to the piston, to reduce the displacement required by the piezoelectric stack.

In the illustrated example, the piezoelectric stack is positioned to extend into the active chamber AC. However, in some instances it may be desirable to avoid direct contact between the piezoelectric stack and the hydraulic fluid, as these are often incompatible. Therefore, the piezoelectric actuator 300 may advantageously comprise a piston assembly (e.g., a metallic disk or the like) coupled to a piezoelectric stack, such that the piston assembly provides an interface to the hydraulic fluid and extends into the active chamber AC under the influence of the piezoelectric stack.

Additionally, while the piezoelectric actuator 300 is shown to extend and retract along the longitudinal axis A, it will be appreciated that any orientation and/or position of the piezoelectric actuator 300 could be used to achieve the same function (i.e., modify the pressure within the active chamber while blocking one or more ports). Alternative arrangements that achieve the function described herein will be apparent to the skilled person.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An anti-lock braking system for an aircraft, comprising:

a hydraulic braking actuator configured to apply a braking pressure to a brake stator; and a piezoelectric actuator integrated with the hydraulic braking actuator, wherein the piezoelectric actuator is operable to modify the braking pressure applied to the brake stator to provide anti-skid protection and wherein the hydraulic braking actuator is configured to be locked in position during operation of the piezoelectric actuator by preventing entry and exit of hydraulic fluid to and from an active chamber of the hydraulic braking actuator.

2. The anti-lock braking system of claim 1, wherein the piezoelectric actuator is operable to lock the hydraulic braking actuator by controlling the entry and exit of hydraulic fluid to and from the braking actuator.

3. The anti-lock braking system of claim 1, wherein the piezoelectric actuator is operable to lock the hydraulic braking actuator and to modify the braking pressure applied to the brake stator by moving within an active chamber of the hydraulic braking actuator.

4. The anti-lock braking system of claim 1, wherein the piezoelectric actuator is operable to move between at least a first position, a second position and a third position, wherein:

in the first position the piezoelectric actuator permits entry and exit of hydraulic fluid to and from the braking actuator;

in the second position and the third position, the piezoelectric actuator blocks entry and exit of hydraulic fluid to and from the braking actuator;

wherein the piezoelectric actuator is operable to modify the braking pressure applied to the brake stator to provide anti-skid protection by moving between the second position and the third position.

5. The anti-lock braking system of claim 1, wherein the hydraulic braking actuator comprises one or more ports for fluidly connecting an active chamber of the hydraulic braking actuator to a supply of pressurised hydraulic fluid, wherein the piezoelectric actuator is operable to lock the hydraulic braking actuator by blocking the one or more ports.

6. The anti-lock braking system of claim 1, wherein the piezoelectric actuator comprises a piezoelectric stack coupled to a piston assembly.

7. The anti-lock braking system of claim 1, further comprising a binary fluid control valve operable to selectively connect the hydraulic braking actuator between a hydraulic fluid source line and a hydraulic fluid return line.

8. The anti-lock braking system of claim 1, wherein the piezoelectric actuator is connected in series with the braking actuator.

9. The anti-lock braking system of claim 8, wherein the anti-lock braking system is operable in a first phase and a second phase, wherein:

in the first phase, the piezoelectric actuator is arranged to be in an extended state and the braking pressure is exerted by the braking actuator extending from a first extension state to a second extension state;

in the second phase, the braking actuator is configured to remain in the second extension state and the piezoelectric actuator is configured to retract from the extended state to a retracted state.

10. The anti-lock braking system of claim 9, wherein in the second phase the braking actuator is arranged to be locked in the second extension state.

11. The anti-lock braking system of claim 10, wherein:

the braking actuator is locked in the second extension state by controlling entry and exit of hydraulic fluid to and from an active chamber of the braking actuator.

12. An aircraft landing gear comprising the anti-lock braking system of claim 1.

13. An aircraft comprising the aircraft landing gear of claim 12.

* * * * *